United States Patent
Kamiya

(10) Patent No.: US 10,447,104 B2
(45) Date of Patent: Oct. 15, 2019

(54) SPINDLE STRUCTURE, ELECTRIC MOTOR, AND MACHINE TOOL FORMED WITH THROUGH HOLE FOR PASSAGE OF FLUID

(71) Applicant: FANUC CORPORATION, Yamanashi (JP)

(72) Inventor: Yohei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 15/082,236

(22) Filed: Mar. 28, 2016

(65) Prior Publication Data
US 2016/0344248 A1    Nov. 24, 2016

(30) Foreign Application Priority Data

May 21, 2015   (JP) .................. 2015-104022

(51) Int. Cl.
| | | |
|---|---|---|
| H02K 1/32 | (2006.01) | |
| H02K 7/14 | (2006.01) | |
| H02K 1/27 | (2006.01) | |
| H02K 9/04 | (2006.01) | |
| B23Q 11/10 | (2006.01) | |
| H02K 7/06 | (2006.01) | |

(52) U.S. Cl.
CPC .......... *H02K 1/32* (2013.01); *B23Q 11/1015* (2013.01); *H02K 1/2706* (2013.01); *H02K 7/06* (2013.01); *H02K 7/14* (2013.01); *H02K 9/04* (2013.01)

(58) Field of Classification Search
CPC .................................. H02K 9/19; H02K 7/06
USPC ..................... 310/52, 60 A, 62, 63
See application file for complete search history.

(56) References Cited

U.S. PATENT DOCUMENTS

| 2,697,986 A | * | 12/1954 | Meagher, Jr. ....... F04D 13/0646 |
| | | | 417/356 |
| 5,505,594 A | * | 4/1996 | Sheehan ................ F04D 3/02 |
| | | | 415/72 |
| 7,843,095 B2 | | 11/2010 | Ai et al. |
| 2008/0265699 A1 | | 10/2008 | Devine |
| 2010/0143164 A1 | | 6/2010 | Yan et al. |

(Continued)

FOREIGN PATENT DOCUMENTS

| CN | 205703433 U | 11/2016 |
| JP | 382356 A | 4/1991 |

(Continued)

OTHER PUBLICATIONS

English Abstract and Machine Translation for Japanese Publication No. 06-170690 A, published Jun. 21, 1994, 6 pgs.

(Continued)

*Primary Examiner* — Terrance L Kenerly
(74) *Attorney, Agent, or Firm* — Fredrikson & Byron, P.A.

(57) ABSTRACT

A spindle structure capable of accelerating the flow of a fluid in through holes of a rotor. The spindle structure includes a rotatable rotation part. The rotation part includes a tool holding part provided at an axial direction one end of the rotation part and through holes that penetrate the rotation part and open at the end in the axial direction. Further the spindle structure includes a vane provided in the through holes. When the rotation part rotates, the vane rotates with the rotation part to allow a fluid in the interior of the through holes to flow toward the end in the axial direction.

10 Claims, 9 Drawing Sheets

(56) References Cited

U.S. PATENT DOCUMENTS

| | | | | |
|---|---|---|---|---|
| 2010/0176603 A1* | 7/2010 | Bushnell | ............... | H02K 9/06 290/1 B |
| 2011/0135416 A1* | 6/2011 | Fry | ............... | B23B 31/265 409/232 |
| 2011/0285134 A1* | 11/2011 | Ortiz | ............... | B60K 6/485 290/52 |
| 2012/0211990 A1* | 8/2012 | Davey | ............... | F03B 13/264 290/54 |

FOREIGN PATENT DOCUMENTS

| | | | |
|---|---|---|---|
| JP | 457650 | A | 2/1992 |
| JP | 6170690 | A | 6/1994 |
| JP | 9103932 | A | 4/1997 |
| JP | 10146021 | A | 5/1998 |
| JP | 2003254294 | A | 9/2003 |
| JP | 2014117119 | A | 6/2014 |
| JP | 201592474 | A | 11/2015 |
| JP | 2015192474 | A | 11/2015 |

OTHER PUBLICATIONS

English Abstract and Machine Translation for Japanese Publication No. 10-146021 A, published May 29, 1998, 7 pgs.

English Abstract and Machine Translation for Japanese Publication No. 2015-192474 A, published Nov. 2, 2015, 14 pgs.

English Abstract and Machine Translation for Japanese Publication No. JPH03-082356 A, published Apr. 8, 1991, 5 pgs.

English Abstract and Machine Translation for Japanese Publication No. 2014-117119 A, published Jun. 26, 2014, 8 pgs.

English Abstract and Machine Translation for Japanese Publication No. 2003-254204 A, published Sep. 10, 2003, 7 pgs.

English Abstract and Machine Translation for Japanese Publication No. 09-103932 A, published Apr. 22, 1997, 7 pgs.

English Abstract and Machine Translation for Japanese Publication No. 04-057650 A, published Feb. 25, 1992, 5 pgs.

English Abstract and Machine Translation for Chinese Publication No. 205703433 U, published Nov. 23, 2016, 9 pgs.

* cited by examiner

SPINDLE STRUCTURE, ELECTRIC MOTOR, AND MACHINE TOOL FORMED WITH THROUGH HOLE FOR PASSAGE OF FLUID

BACKGROUND OF THE INVENTION

1. Field of the Invention

The invention relates to a spindle structure, an electric motor, and a machine tool in which a through hole for allowing a fluid to flow is formed.

2. Description of the Related Art

Spindle structures and electric motors including a rotor in which a through hole for allowing a fluid, such as a refrigerant, to flow is formed are known (for example, Japanese Laid-open Patent Publication No. H6-170690 and Japanese Laid-open Patent Publication No. H10-146021).

In such devices, techniques for accelerating the flow of the fluid in the through hole of the rotor have been sought.

SUMMARY OF THE INVENTION

In an aspect of the invention, a spindle structure of a machine tool comprises a rotation part. The rotation part includes a tool holding part provided at an end in an axial direction of the rotation part, and a through hole extending through the rotation part so as to open at the end in the axial direction.

Further, the spindle structure comprises a vane provided in the through holes. When the rotation part is rotated, the vane rotates together with the rotation part so as to make a fluid present in the through hole flow toward the end in the axial direction.

A plurality of vanes may be arranged so as to align in a circumferential direction of a wall surface which defines the through hole. The spindle structure may comprise an electric motor including a stator and a rotor which is rotatably arranged at radially inside of the stator and which constitutes the rotation part. The rotor may have the through hole.

The spindle structure may comprise a spindle device including a spindle housing and a spindle rotor which is rotatably arranged in the spindle housing and which constitutes the rotation part. The spindle rotor may have the end in the axial direction and the through hole. The spindle structure may further comprise a ring member which supports the vane and which is attached to the through hole. A concave or convex part may be formed on a surface of the vane.

In another aspect of the invention, an electric motor comprises a stator, a rotor rotatably arranged at radially inside of the stator. A tool is connected to an end in an axial direction of the rotor. The rotor includes a through hole extending through the rotor so as to open at the end in the axial direction.

Further, the electric motor comprises a vane provided in the through hole. When the rotor is rotated, the vane rotates together with the rotor so as to make a fluid present in the through hole flow toward the end in the axial direction.

In still another aspect of the invention, a machine tool comprises the above-mentioned spindle structure, or the above-mentioned electric motor.

BRIEF DESCRIPTION OF DRAWINGS

The above or other objects, features, and advantages of the invention will be clarified by the following detailed description of a preferred embodiment with reference to the accompanying drawings, in which.

DETAILED DESCRIPTION

Figure 1:
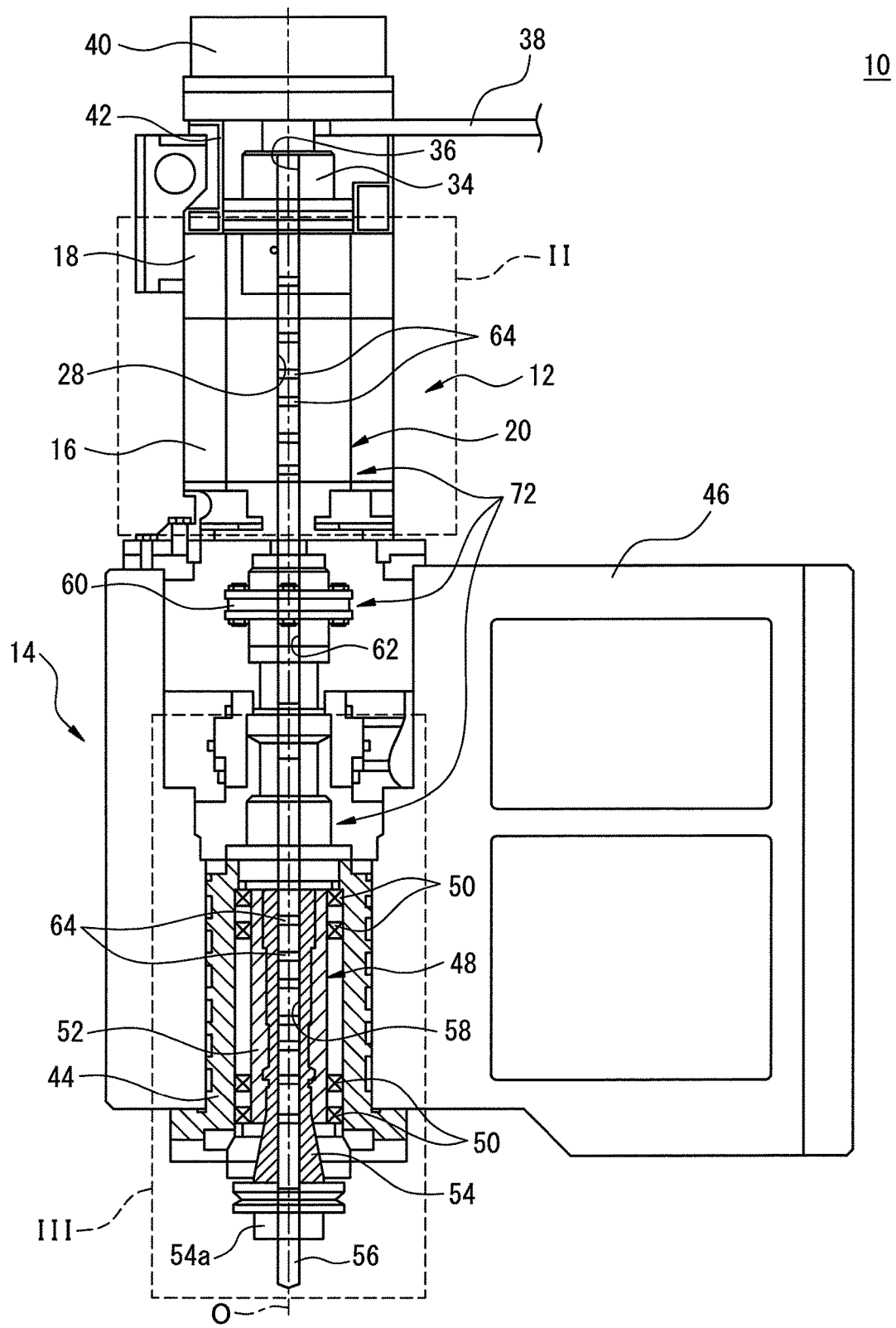
FIG. 1 is a lateral view of a spindle structure according to an embodiment of the invention, in which a part of the spindle structure is shown by cross-section.
Figure 2:
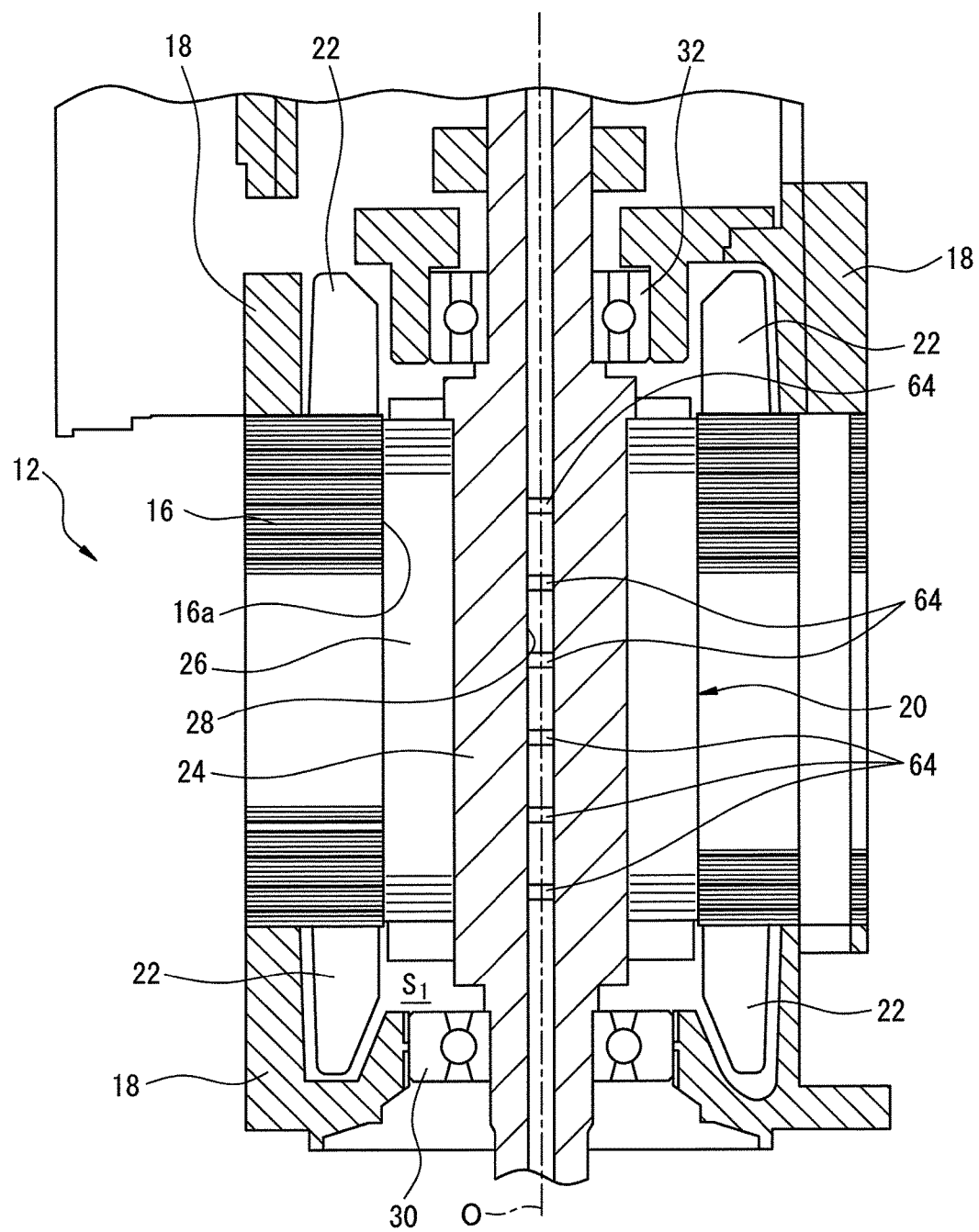
FIG. 2 is an enlarged cross-sectional view of region II in FIG. 1.
Figure 3:
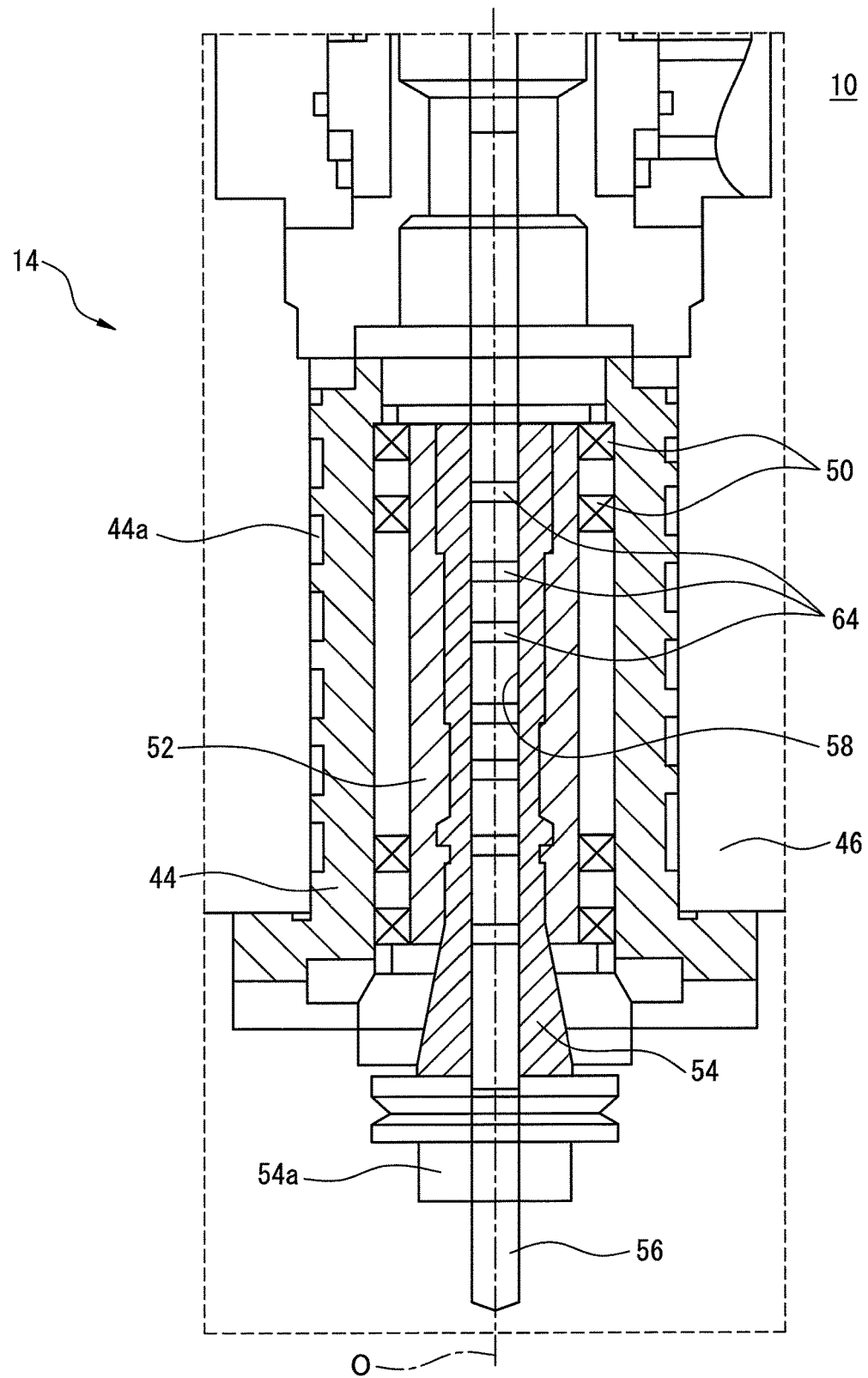
FIG. 3 is an enlarged cross-sectional view of region III in FIG. 1.

Hereinafter, embodiments of the invention will be described in detail with reference to the Drawings. Firstly, a spindle structure 10 according to an embodiment of the invention will be described with reference to FIGS. 1-3. Note that, in the following description, an axial direction indicates a direction along an axis O in the figures. Further, for convenience of explanation, the downward in FIG. 1 is referred as an axially frontward (i.e., a frontward in the axial direction). Further, a radial direction indicates a radial direction of a circle centered about the axis O, while a circumferential direction indicates a circumferential direction of the circle centered about the axis O.

The spindle structure 10 is provided at a machine tool (not shown) for machining a workpiece. The spindle structure 10 includes an electric motor 12 and a spindle device 14. The electric motor 12 includes a stator 16, a housing 18, and a rotor 20.

The stator 16 is comprised of a plurality of magnetic steel sheets stacked in the axial direction, and has a cylindrical inner circumferential surface 16a. A coil 22 is wound around the stator 16. The housing 18 is fixed to a front and rear ends in the axial direction of the stator 16. The housing 18 defines an inner space $S_1$ together with the stator 16.

The rotor 20 is rotatably arranged at radially inside of the stator 16. The rotor 20 includes a rotation shaft 24 extending in the axial direction and a rotor core 26 fixed at the radially outside of the rotation shaft 24.

The rotation shaft 24 is a circular member having the axis O as a center axis thereof, and linearly extends in the axial direction. A through hole 28 is formed at a center part of the rotation shaft 24. The through hole 28 extends through the rotation shaft 24 in the axial direction.

The rotor core 26 is a cylindrical member, and arranged so as to surround the rotation shaft 24. A plurality of magnets (not shown) is built into the rotor core 26 so as to be aligning in the circumferential direction.

The rotation shaft 24 of the rotor 20 is rotatably supported by a bearing 30 at the axially front side and a bearing 32 at the axially rear side. The bearings 30 and 32 are fitted to the housing 18.

An axially rear end of the rotation shaft 24 is coupled to a rotation joint 34. The rotation joint 34 rotatably receives the axially rear end of the rotation shaft 24. A through hole 36 is formed in the rotation joint 34 so as to be in fluid communication with the through hole 28 of the rotation shaft 24.

A fluid supply pipe 38 is coupled to the rotation joint 34. The inside of the fluid supply pipe 38 is in fluid communication with the through hole 36. The fluid supply pipe 38 is coupled to a fluid supply device (not shown) provided at outside of the spindle structure 10.

The fluid supply device supplies a fluid, such as coolant for cooling the electric motor 12 and the spindle device 14 or compressed gas for blowing away chips produced during processing the workpiece, into the through hole 36 via the fluid supply pipe 38.

The electric motor 12 further includes an electric fan 40. The electric fan 40 is fixed at axially rear side of the stator 16 via a fitting member 42. The electric fan 40 generates an air flow in the inner space $S_1$ so as to cool elements of the electric motor 12, such as the rotor 20 and the stator 16.

The spindle device 14 includes a spindle housing 44, a support base 46, and a spindle rotor 48. The spindle housing 44 is a cylindrical member and supported by the support base 46. A groove 44a for the passage of the refrigerant is formed at an outer circumferential surface of the spindle housing 44.

The spindle rotor 48 is rotatably arranged at radially inside of the spindle housing 44. The spindle rotor 48 includes a spindle part 52 and a tool holding mechanism 54. The spindle part 52 is a cylindrical member extending in the axial direction. The spindle part 52 is rotatably supported at radially inside of the spindle housing 44 via a plurality of bearings 50.

The tool holding mechanism 54 is housed in the spindle part 52, and linearly extends in the axial direction. The tool holding mechanism 54 includes a tool holding part 54a at an axially front end thereof, and a tool 56 for processing a workpiece is attached to the tool holding part 54a. A through hole 58 is formed at a center part of the tool holding mechanism 54. The through hole 58 extends through the tool holding mechanism 54 in the axial direction so as to open to the outside at the axially front end of the tool holding mechanism 54.

The axially front end of the rotation shaft 24 of the rotor 20 is coupled to a coupling 60 from axially rear side. A through hole 62 is formed at a center part of the coupling 60 so as to be in fluid communication with the through hole 28 of the rotation shaft 24.

On the other hand, the axially rear end of the tool holding mechanism 54 of the spindle rotor 48 is coupled to the coupling 60 from axially front side. The through hole 58 of the tool holding mechanism 54 is in fluid communication with the through hole 62 of the coupling 60.

Thus, the rotor 20 and the spindle rotor 48 are coupled to each other via the coupling 60, and rotate integrally with each other. That is, the tool 56 is mechanically connected to the axially front end of the rotor 20 via the coupling 60 and the spindle rotor 48, and is rotated by a rotation force of the rotor 20 generated when voltage is applied to the coil 22.

Figure 4:
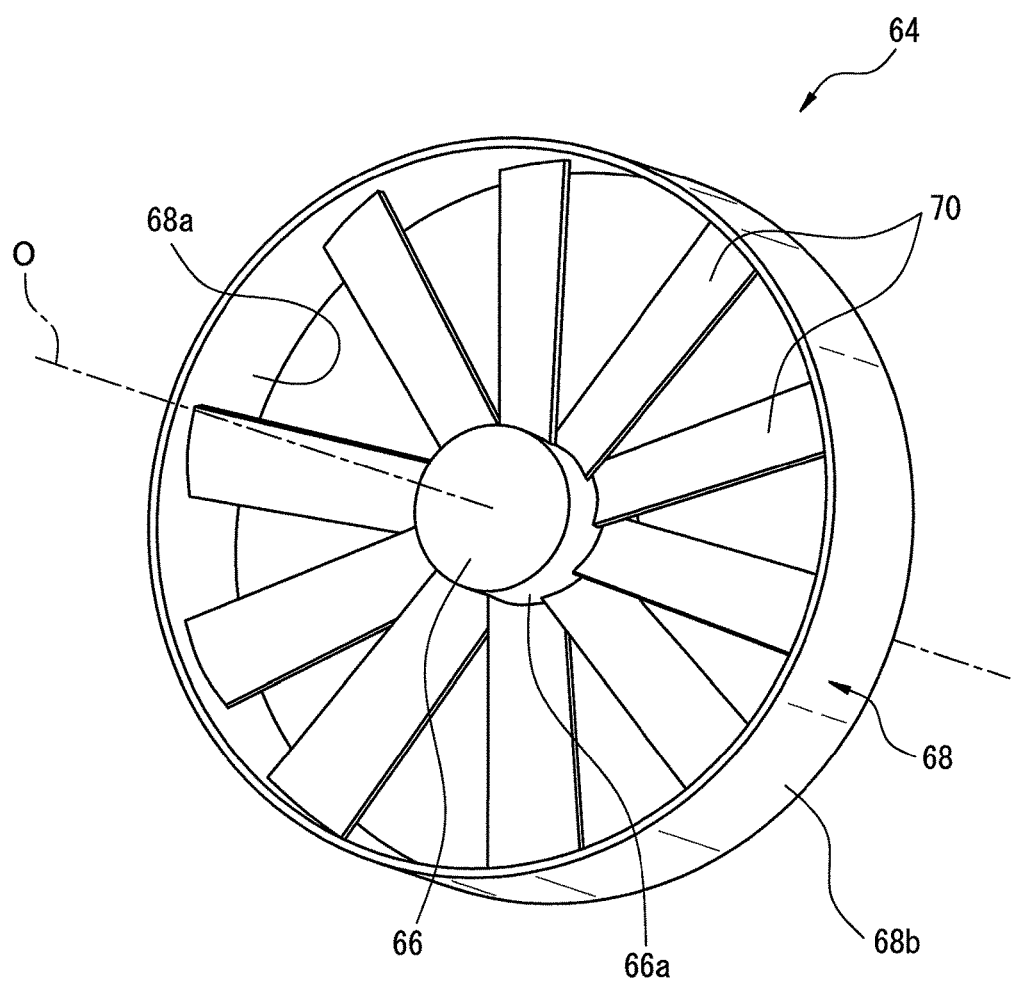
FIG. 4 is a perspective view of a fluid flow member shown in FIG. 1.

In this embodiment, a plurality of fluid flow members 64 are arranged in the through hole 28 formed at the rotor 20 and the through hole 58 formed at the spindle rotor 48. Hereinafter, the fluid flow member 64 according to this embodiment will be described with reference to FIG. 4.

Each fluid flow member 64 includes a center shaft 66, a ring member 68, and a plurality of vanes 70. The center shaft 66 is a columnar member extending in the axial direction, and is arranged so as to have the axis O as a center axis thereof.

The ring member 68 includes an inner circumferential surface 68a and an outer circumferential surface 68b opposite the inner circumferential surface 68a. The ring member 68 is disposed at radially outside of the center shaft 66 so as to surround the center shaft 66.

Each of the vanes 70 is a thin plate extending in the radial direction, and a radially inner end thereof is fixed to the outer circumferential surface 66a of the center shaft 66, while a radially outer end thereof is fixed to the inner circumferential surface 68a of the ring member 68.

Each of the vanes 70 is disposed so as to be inclined with respect to a plane orthogonal to the axis O. In this embodiment, a total of ten vanes 70 are arranged so as to align in the circumferential direction at substantially equal intervals.

The fluid flow members 64 are fixed to a wall surface which defines the through holes 28, 58 by e.g. shrink-fit, cooling-fit, or interference-fit by pushing-in. Consequently, the outer circumferential surface 68b of the ring member 68 is pressed against the wall surface defining the through holes 28, 58 so as to be immovably fixed thereto.

Accordingly, when the rotor 20 and the spindle rotor 48 is rotated, the fluid flow members 64 respectively arranged in the through holes 28 and 58 rotate integrally with the rotor 20 and the spindle rotor 48.

The vanes 70 of the fluid flow members 64 are arranged so as to make a fluid present in the through holes 28, 58 flow frontward in the axial direction when the fluid flow members 64 rotate in one direction of the circumferential direction.

Next, a function of the spindle structure 10 will be described with reference to FIGS. 1-4. When a workpiece is processed, a voltage is applied to the coil 22 of the electric motor 12, thereby the rotation shaft 24 is rotated in one direction of the circumferential direction. The rotation force of the rotation shaft 24 is transmitted to the spindle rotor 48 of the spindle device 14 through the coupling 60.

Consequently, the rotation shaft 24, the coupling 60, and the spindle rotor 48 rotate integrally with each other. Thus, in this embodiment, the rotation shaft 24, the coupling 60, and the spindle rotor 48 constitute a rotation part 72 of the spindle structure 10.

The tool 56 held by the tool holding mechanism 54 rotates together with the spindle rotor 48 so as to process the workpiece W. During processing the workpiece W, the fluid supply device supplies a fluid, such as a coolant or compressed gas, into the through hole 36 of the rotation joint 34 through the fluid supply pipe 38.

The fluid introduced into the through hole 36 passes through the through hole 28 of the rotation shaft 24, the through hole 62 of the coupling 60, and the through hole 58 of the spindle rotor 48, and is discharged from the opening at the axially front end of the through hole 58 to the outside.

As the rotation part 72 of the spindle structure 10 is rotated in one direction of the circumferential direction, the plurality of fluid flow members 64 disposed in the through holes 28 and 58 rotate integrally with the rotation part 72. Consequently, the vanes 70 rotate in the one direction of the circumferential direction, and thereby the pressure of the fluid in the through holes 28 and 58 is increased so as to make the fluid flow toward axially frontward in the through holes 28 and 58, as a result of which the flow of the fluid toward axially frontward is accelerated.

As stated above, in this embodiment, the pressure of the fluid can be increased so as to make the fluid flow toward axially frontward by the vanes 70 rotating together with the rotation part 72 of the spindle structure 10. Accordingly, the supply pressure of the fluid supplied from the fluid supply device can be set to be lower, in comparison with a case in which the fluid flow members 64 are not provided.

This is because, even if the supply pressure of the fluid is set to be comparatively low, the pressure of the fluid can be increased by the rotating vanes 70, and therefore it is possible to sufficiently maintain the discharge pressure of the fluid discharged from the opening at the axially front end of the through hole 58.

Thus, since the supply pressure of the fluid can be set to be lower, a load applied to the rotation joint 34 can be reduced, thereby it is possible to extend the lifetime of the rotation joint 34. In addition, it is also possible to prevent the fluid from leaking out from the through hole 36 of the rotation joint 34.

Further, in this embodiment, the ring members 68 of the fluid flow members 64 are in contact with the wall surface defining the through holes 28, 58. Accordingly, heat accumulated in the rotor 20 and the spindle rotor 48 can conduct to the vanes 70 and the center shaft 66 through the ring members 68.

Then, the heat can be effectively eliminated by the fluid flowing in the through holes 28 and 58. Thus, each fluid flow member 64 functions as a heat dissipation element, and therefore it is possible to improve the cooling capability of the spindle structure 10.

Note that, in the above-mentioned embodiment, the fluid flow members 64 are provided in both the through hole 28 of the rotor 20 and the through hole 58 of the spindle rotor 48. However, the fluid flow member 64 may be provided in either the through hole 28 of the rotor 20 or the through hole 58 of the spindle rotor 48.

Such an embodiment will be described with reference to FIGS. 5 and 6. Note that, in various embodiments described below, elements similar to those in the already-mentioned embodiment are assigned the same reference numerals, and detailed description thereof will be omitted.

Figure 5:
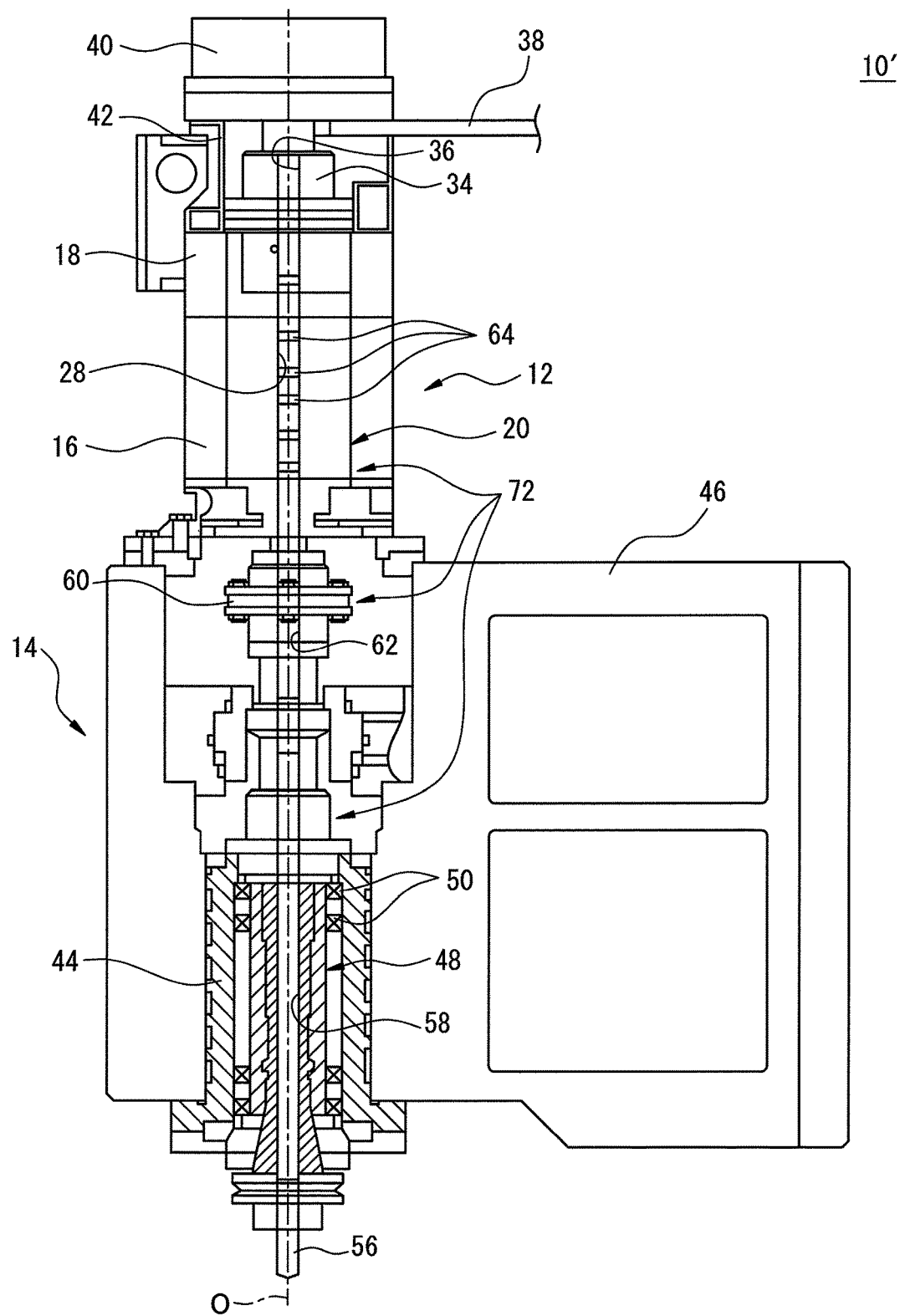
FIG. 5 is a lateral view of a spindle structure according to another embodiment of the invention, in which a part of the spindle structure is shown by cross-section.
Figure 6:
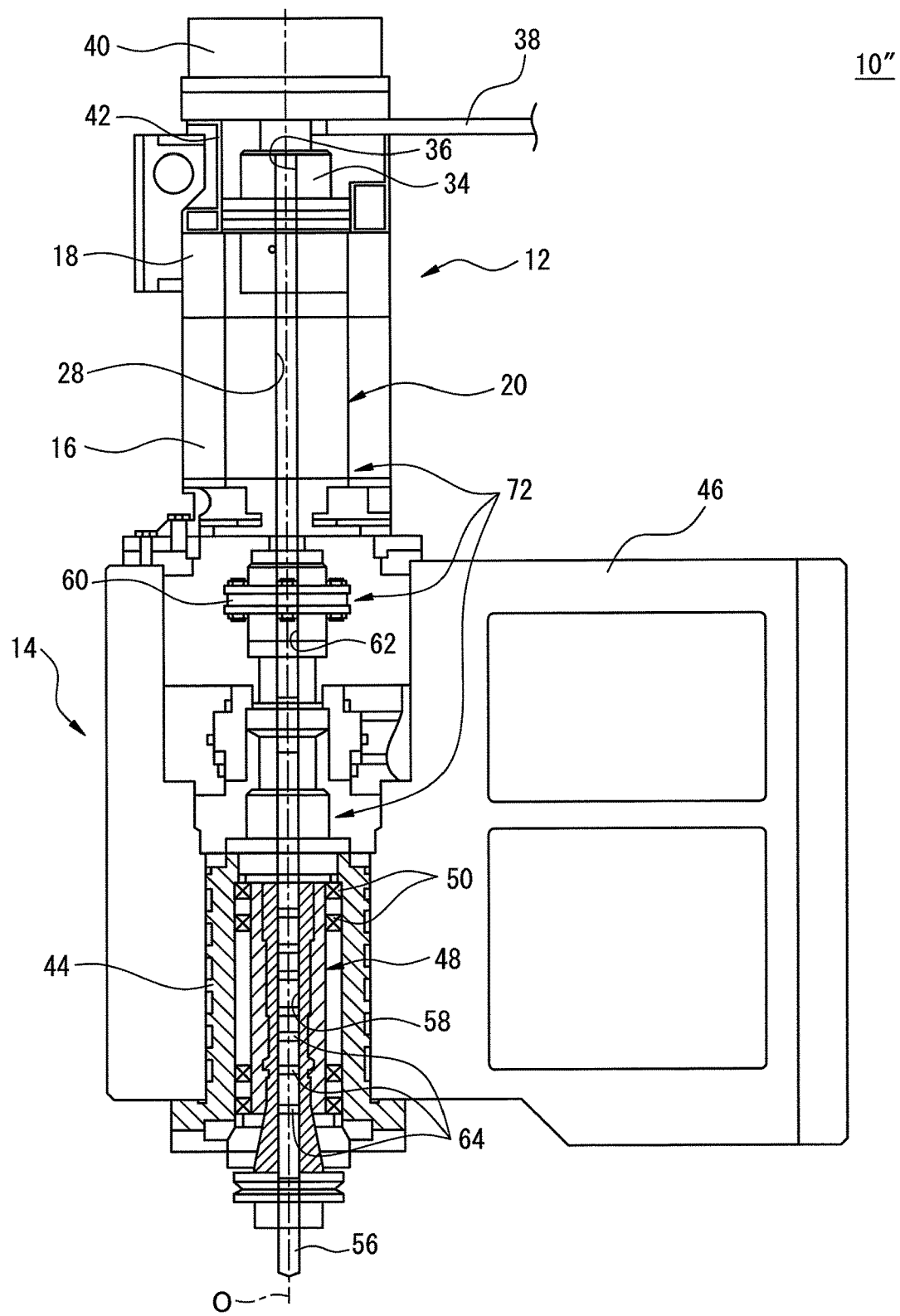
FIG. 6 is a lateral view of a spindle structure according to still another embodiment of the invention, in which a part of the spindle structure is shown by cross-section.

In a spindle structure 10' shown in FIG. 5, the plurality of fluid flow members 64 are inserted only into the through hole 28 of the rotor 20. On the other hand, in a spindle structure 10" shown in FIG. 6, the plurality of fluid flow members 64 are inserted only into the through hole 58 of the spindle rotor 48.

According to these spindle structures 10' and 10", the fluid flow in the through holes 28, 58 toward axially frontward can be accelerated by the fluid flow members 64 rotating together with the rotation part 72.
Accordingly, it is possible to set the supply pressure of the fluid supplied from the fluid supply device to be lower.

Figure 7:
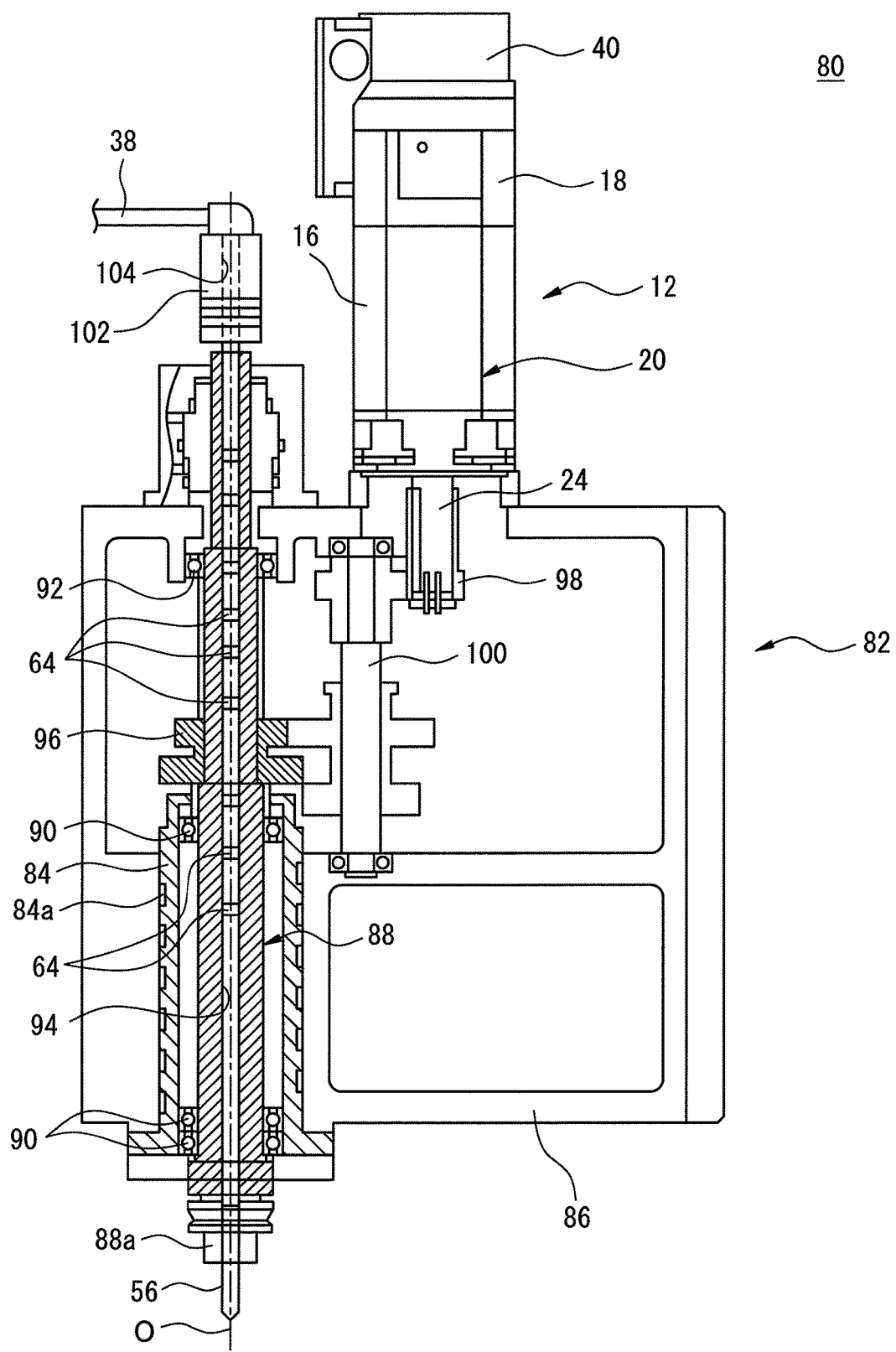
FIG. 7 is a lateral view of a spindle structure according to still another embodiment of the invention, in which a part of the spindle structure is shown by cross-section.

Next, a spindle structure 80 according to still another embodiment of the invention will be described with reference to FIG. 7. Note that, in the following description, for convenience of explanation, the downward in FIG. 7 is referred as an axially frontward. The spindle structure 80 includes the electric motor 12 and a spindle device 82.

The spindle device 82 includes a spindle housing 84, a support base 86, and a spindle rotor 88. The spindle housing 84 is a cylindrical member and supported by the support base 86. A groove 84a for the passage of the refrigerant is formed on an outer circumferential surface of the spindle housing 84.

The spindle rotor 88 is rotatably arranged at radially inside of the spindle housing 84 via a plurality of bearings 90. Further, the spindle rotor 88 is rotatably supported by the support base 86 at its axially rear side via a bearing 92.

The spindle rotor 88 linearly extends in the axial direction, and includes a tool holding part 88a at its axially front end. The tool 56 for processing a workpiece is attached to the tool holding part 88a. A through hole 94 is formed at a center part of the spindle rotor 88. The through hole 94 extends through the spindle rotor 88 in the axial direction, and opens to the outside at the axially front end of the spindle rotor 88.

A gear part 96 is formed at a center part in the axial direction of the spindle rotor 88. On the other hand, a gear part 98 is formed at an axially front end of the rotation shaft 24 of the electric motor 12. The gear part 96 of the spindle rotor 88 and the gear part 98 of the rotation shaft 24 engage each other via a gear stage 100.

Accordingly, the rotation force generated by the electric motor 12 is transmitted to the spindle rotor 88 via the gear part 98 of the rotation shaft 24, the gear stage 100, and the gear part 96 of the spindle rotor 88. Thus, the spindle rotor 88 is rotated by the power generated by the electric motor 12. In this embodiment, the spindle rotor 88 constitutes a rotation part of the spindle structure 80.

An axially rear end of the spindle rotor 88 is connected to a rotation joint 102. The rotation joint 102 rotatably receives the axially rear end of the spindle rotor 88. A through hole 104 is formed at the rotation joint 102 so as to be in fluid communication with the through hole 94 of the spindle rotor 88.

The fluid supply pipe 38 is connected to the rotation joint 102 so that the inside of the fluid supply pipe 38 is in fluid communication with the through hole 104. The fluid supply pipe 38 is connected to a fluid supply device (not shown) provided outside of the spindle structure 80.

The fluid supply device supplies a fluid, such as coolant for cooling the spindle device 82 or compressed gas for blowing away chips produced during processing the workpiece, into the through hole 104 via the fluid supply pipe 38.

In this embodiment, a plurality of fluid flow members 64 as described above are arranged in the through hole 94 formed at the spindle rotor 88. Specifically, the fluid flow members 64 are fixed to a wall surface which defines the through hole 94 by e.g. shrink-fit, cooling-fit, or interference-fit by pushing-in.

Consequently, the outer circumferential surfaces 68b of the ring members 68 (FIG. 4) of the fluid flow members 64 are pressed against the wall surface defining the through hole 94 so as to be immovably fixed thereto. Due to this, when the spindle rotor 88 is rotated, the fluid flow members 64 disposed in the through hole 94 rotate integrally with the spindle rotor 88.

According to this embodiment, similarly to the embodiment shown in FIG. 1, the fluid flow in the through hole 94 toward axially frontward can be accelerated by the vanes 70 of the fluid flow members 64 which rotate together with the spindle rotor 88. Accordingly, it is possible to lower the supply pressure of the fluid supplied from the fluid supply device.

Figure 8:
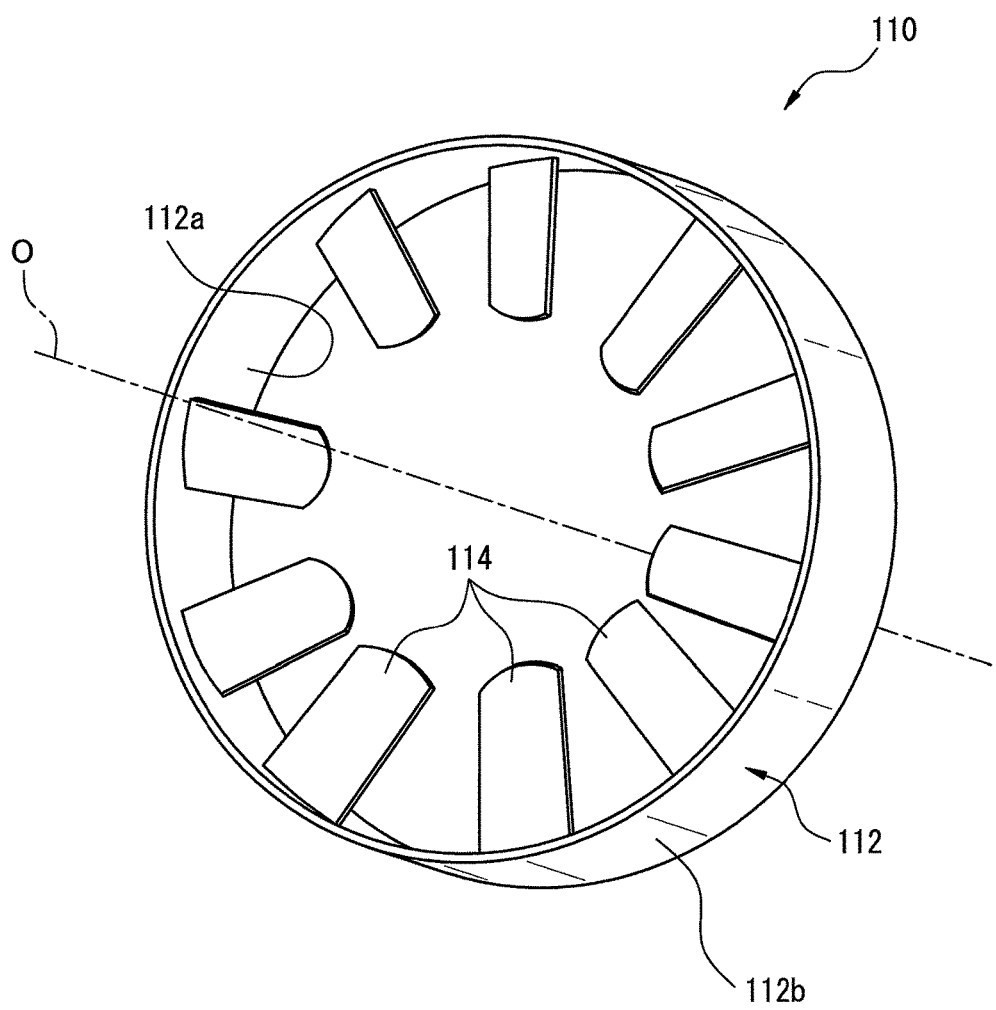
FIG. 8 is a perspective view of a fluid flow member according to another embodiment of the invention.

Next, a fluid flow member 110 according to another embodiment of the invention will be described with reference to FIG. 8. The fluid flow member 110 can be applied to the spindle structures 10, 10', 10" and 80, instead of the fluid flow member 64.

The fluid flow member 110 includes a ring member 112 and a plurality of vanes 114. The ring member 112 is a cylindrical member arranged so as to have the axis O as a center axis thereof. The ring member 112 has an inner circumferential surface 112a and an outer circumferential surface 112b opposite the inner circumferential surface 112a.

Each of the vanes 114 extends from the inner circumferential surface 112a of the ring member 112 toward radially inside, and terminates at a position in the radial direction between the inner circumferential surface 112a and the axis O. Thus, in the fluid flow member 110, a center region thereof including the axis O is a hollow in which no member is present.

Each of the vanes 114 is disposed so as to be inclined with respect to a plane orthogonal to the axis O. In this embodiment, a total of ten vanes 114 are disposed so as to align in the circumferential direction at substantially equal intervals.

Similarly to the above-mentioned fluid flow member 64, the fluid flow member 110 is fixed to the wall surface defining the through hole 28, 58, 94 by e.g. shrink-fit, cooling-fit, or interference-fit by pushing-in. Consequently, the outer circumferential surface 112b of the ring member 112 is pressed against the wall surface defining the through hole 28, 58, 94 so as to be immovably fixed thereto.

Similarly to the-mentioned embodiment, the vanes 114 of the fluid flow member 110 are arranged so as to make a fluid present in the through hole 28, 58, 94 flow toward axially frontward when the fluid flow member 110 is rotated in one direction of the circumferential direction.

According to the fluid flow member 110 of this embodiment, the fluid flow in the through hole 28, 58, 94 toward axially frontward can be accelerated by the rotating vanes 114, while it is possible to prevent a fluid resistance in the through hole 28, 58, 94 from increasing due to the fluid flow member 110, since the center region of the fluid flow member 110 is a hollow.

Figure 9:
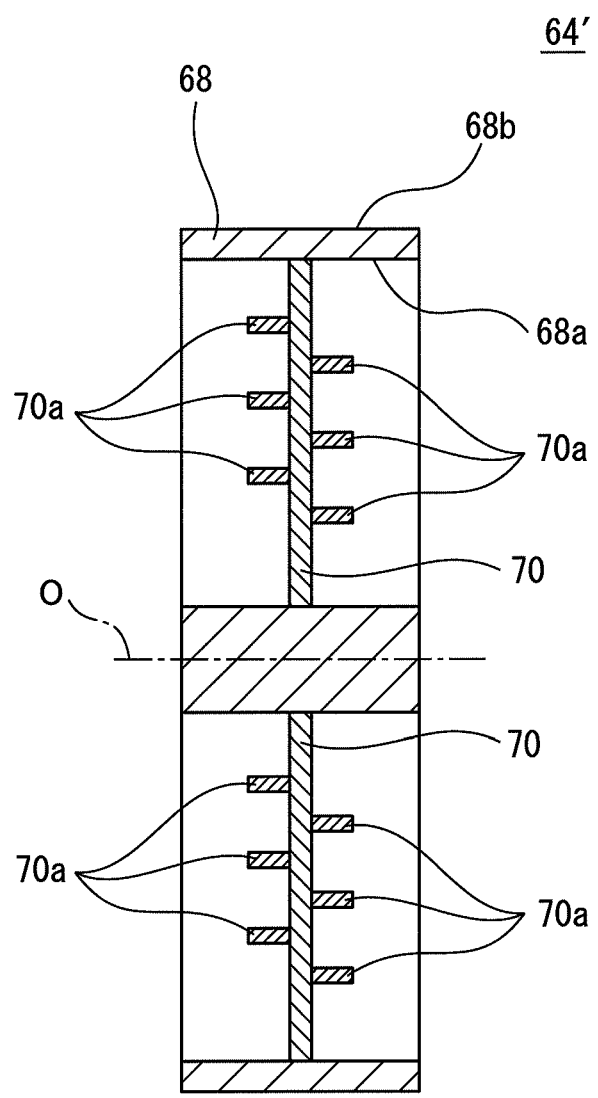
FIG. 9 is a cross-sectional lateral view of a fluid flow member according to still another embodiment of the invention.

Next, a fluid flow member 64' according to still another embodiment of the invention will be described with reference to FIG. 9. The fluid flow member 64' differs from the above-mentioned fluid flow member 64 in the feature wherein it includes a plurality of convex parts 70a formed at surfaces of the vanes 70.

Specifically, the convex parts 70a are formed so as to protrude axially frontward from axially front end surfaces of the vanes 70 and axially rearward from axially rear end surfaces of the vanes 70, respectively. These convex parts 70a function as heat dissipation fins, and increase the surface area of the vanes 70, thereby a heat dissipation effect of the fluid flow member 64' can be enhanced.

Note that, in the above-mentioned embodiments, the plurality of vanes 70, 114 are provided. However, only one vane may be provided. In this case, an effect of accelerating the fluid flow can be obtained.

Further, in the above-mentioned embodiments, the fluid flow member 64, 64', 110 includes the ring member 68, 112, and the vanes 70, 114 are fixed to the inner circumferential surface 68a, 112a of the ring member 68, 112. However, the ring member 68, 112 may be omitted, and the vanes may be directly fixed to the wall surface defining the through hole 28, 58, 94.

Further, the vane may be provided so as to be immovable at least in the circumferential direction relative to the wall surface defining the through hole 28, 58, 94. In other words, the vane may be movable in the axial direction relative to the wall surface defining the through hole 28, 58, 94. In such a case, the vane can rotate together with the rotation part of the spindle structure, thereby an effect of accelerating the fluid flow can be obtained.

Further, the vane may have any shape as long as it is able to cause the fluid to flow by rotating. Further, in the embodiment shown in FIG. 9, the vane 70 may include a concave part recessed inward from the surface of the vane 70, instead of the convex part 70a. In this case, the surface area of the fluid flow member 64' is increased, thereby a heat dissipation effect of the fluid flow members 64' can be enhanced.

The invention has been described above through the embodiments of the invention, but the above embodiments do not limit the invention according to the claims. Embodiments in which the features described in the embodiments of the invention are combined may be also included in the technical scope of the invention, but all the combinations of the features are not necessarily essential to means provided by aspects of the invention. Further, it is apparent to those skilled in the art that the embodiments can be modified or improved in various ways.

The invention claimed is:

1. A spindle structure of a machine tool, comprising:
a rotation part including:
 a tool holding part provided at an end in an axial direction of the rotation part; and
 a through hole axially extending through the rotation part so as to open at the end in the axial direction; and
a plurality of individual fluid flow members disposed along the through hole so as to be separate from each other, and rotating together with the rotation part so as to make a fluid present in the through hole flow toward the end in the axial direction when the rotation part is rotated, wherein each of the plurality of individual fluid flow members includes:
a solid center shaft;
a ring member disposed radially outside of the center shaft so as to surround the center shaft, and pressed against a wall surface defining the through hole so as to be fixed to the wall surface; and
a plurality of vanes, one end of each vane being fixed to the center shaft, the other end of each vane being fixed to the ring member.

2. The spindle structure according to claim 1, wherein a plurality of vanes are arranged so as to align in a circumferential direction of a wall surface which defines the through hole.

3. The spindle structure according to claim 1, comprising an electric motor including:
a stator; and
a rotor rotatably arranged at radially inside of the stator and constituting the rotation part, wherein
the rotor has the through hole.

4. The spindle structure according to claim 1, comprising a spindle device including:
a spindle housing; and
a spindle rotor rotatably arranged in the spindle housing and constituting the rotation part, wherein
the spindle rotor has the end in the axial direction and the through hole.

5. The spindle structure according to claim 1, wherein the ring member is attached to the through hole.

6. The spindle structure according to claim 1, wherein a concave or convex part is formed on a surface of the vane.

7. A machine tool comprising the spindle structure according to claim 1.

8. The spindle structure according to claim 1, wherein each vane is a flat plate disposed so as to be inclined with respect to a plane orthoganol to the axis direction, wherein the plurality of vanes are disposed so as to align in the circumferential direction as substantially equal intervals.

9. An electric motor comprising:

a stator;

a rotor rotatably arranged radially inside of the stator, a tool being connected to an end in an axial direction of the rotor, the rotor including a through hole axially extending through the rotor so as to open at the end in the axial direction;

a plurality of individual fluid flow members disposed along the through hole so as to be separate from each other, and rotating together with the rotation part so as to make a fluid present in the through hole flow toward the end in the axial direction when the rotation part is rotated, wherein each of the plurality of individual fluid flow members includes:

a solid center shaft;

a ring member disposed radially outside of the center shaft so as to surround the center shaft, and pressed against a wall surface defining the through hole so as to be fixed to the wall surface; and a vane provided in the through hole, one end of the vane being fixed to the center shaft, the other end of the vane being fixed to the ring member.

10. A machine tool comprising the electric motor according to claim 9.

* * * * *